(12) United States Patent
Lekutai

(10) Patent No.: US 12,072,423 B2
(45) Date of Patent: Aug. 27, 2024

(54) UNMANNED AERIAL VEHICLE ASSISTED POSITIONING

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 409 days.

(21) Appl. No.: 17/191,274

(22) Filed: Mar. 3, 2021

(65) Prior Publication Data

US 2022/0283313 A1 Sep. 8, 2022

(51) Int. Cl.
*G01S 19/03* (2010.01)
*G08G 5/00* (2006.01)
*H04W 4/021* (2018.01)
*H04W 4/44* (2018.01)
*H04W 76/10* (2018.01)
*H04W 84/12* (2009.01)

(52) U.S. Cl.
CPC ............ *G01S 19/03* (2013.01); *G08G 5/0013* (2013.01); *G08G 5/0069* (2013.01); *H04W 4/021* (2013.01); *H04W 4/44* (2018.02); *H04W 76/10* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 2016/0292696 A1* | 10/2016 | Gong | ...................... | H04L 67/12 |
| 2017/0193820 A1* | 7/2017 | Sham | ................... | G08G 5/0078 |
| 2017/0195038 A1* | 7/2017 | Sham | ...................... | H04L 67/12 |
| 2017/0358222 A1* | 12/2017 | Schubert | .............. | G08G 5/0013 |
| 2018/0077518 A1* | 3/2018 | Nguyen | ................... | H04W 4/06 |
| 2018/0156616 A1 | 6/2018 | Bennett et al. | | |
| 2019/0044609 A1* | 2/2019 | Winkle | ................ | H04B 7/1856 |
| 2019/0322367 A1* | 10/2019 | El Idrissi | .......... | G08G 1/096827 |
| 2020/0126413 A1* | 4/2020 | Sham | ...................... | G08G 1/012 |
| 2020/0191581 A1* | 6/2020 | Chun | ..................... | B64U 70/00 |
| 2021/0321233 A1* | 10/2021 | Mach | ...................... | H04W 4/46 |

FOREIGN PATENT DOCUMENTS

| | | |
|---|---|---|
| EP | 3664479 A2 | 6/2020 |
| GB | 2532966 A | 6/2016 |
| WO | WO2018071453 A1 | 4/2018 |

OTHER PUBLICATIONS

Extended European Search Report mailed Aug. 31, 2022 for European Patent Application No. 22159832.9, 9 pages.

* cited by examiner

*Primary Examiner* — Christian Chace
*Assistant Examiner* — Shayne M. Gilbertson
(74) *Attorney, Agent, or Firm* — Lee & Hayes, P.C.

(57) ABSTRACT

Techniques for improving a vehicles access to GPS signals are discussed herein. An unmanned aerial vehicle (UAV) may be configured to communicate with the vehicle, such as a V2X capable vehicle, and provide GPS line of sight connection to a GPS satellite, thereby avoiding any blocking issues while maintaining accurate positioning of the vehicle on the ground. Short-range communications (e.g., Wi-Fi, PC5, unicast, etc.) may be used to provide the connectivity between the vehicle and the UAV. In some cases, a vehicle may drive into a designated area and the UAV and/or the vehicle may initiate connectivity with the other and start UAV assisted positioning services within the designated area.

20 Claims, 7 Drawing Sheets

UNMANNED AERIAL VEHICLE ASSISTED POSITIONING

BACKGROUND

Accurate vehicle positioning is key for vehicle-to-everything (V2X) applications such as lane changing, remote driving, platooning, etc. The Global Position System (GPS) is typically used for vehicle positioning and offers precise positioning data. However, these GPS signals are sensitive to blockages such as stacked highways, buildings in urban canyons, etc., and their accuracy may be degraded. Degraded accuracy of GPS signal data may result in collisions of vehicles relying on the GPS signal data to navigate.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
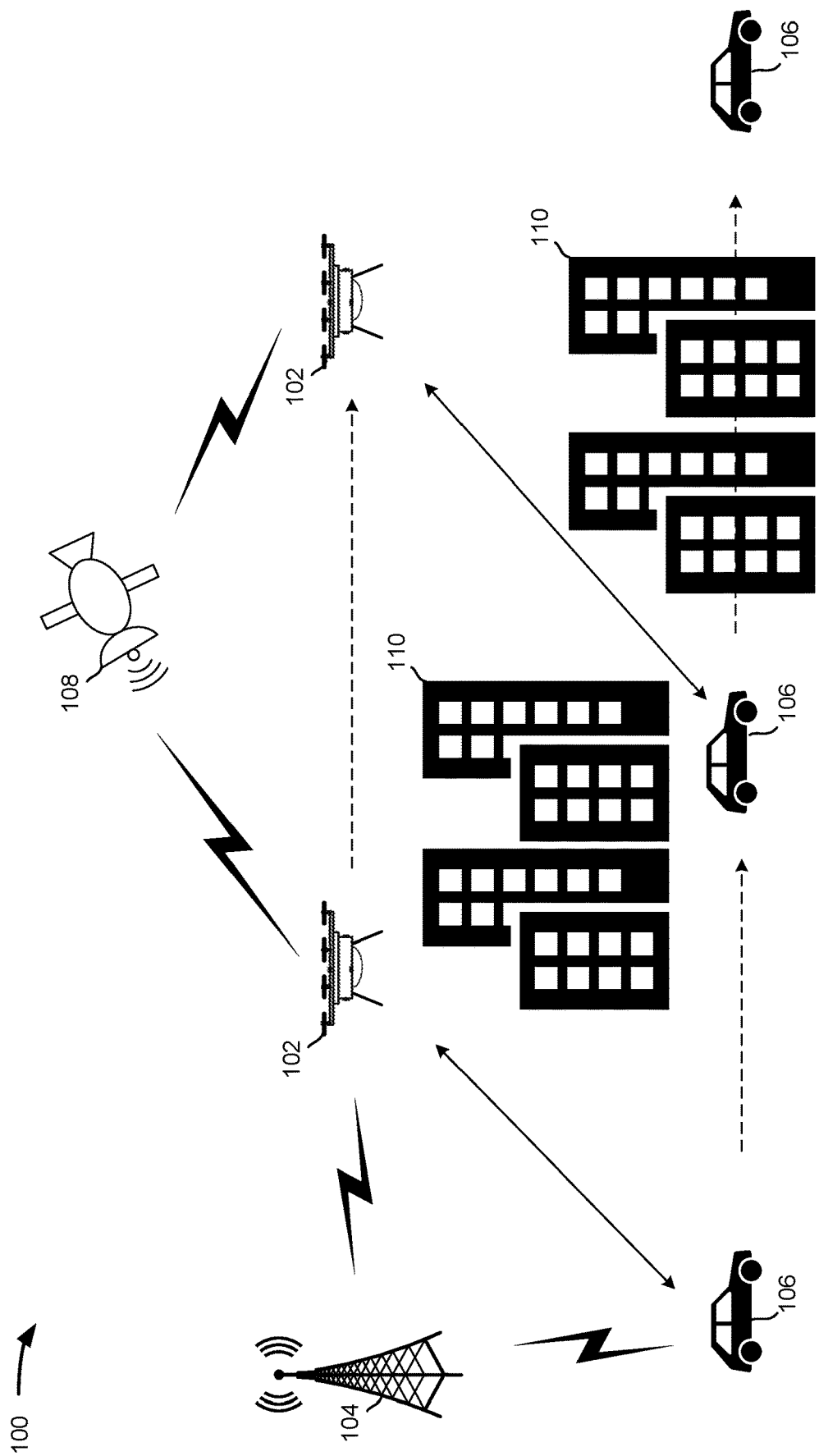
FIG. 1 illustrates an example environment in which the present disclosure may be implemented.

The methods, devices, and computer readable media discussed herein are directed to an unmanned aerial vehicle (UAV) (e.g., drone) configured to communicate with a vehicle, such as a V2X capable vehicle, and provide GPS line of sight connection to a GPS satellite thereby avoiding any blocking issues while maintaining accurate positioning of the vehicle on the ground. Short-range communications (e.g., Wi-Fi, PC5, unicast, etc.) may be used to provide the connectivity between the vehicle and the UAV. In some cases, a vehicle may drive into a designated area and the UAV, a base station located in the designated area, and/or the vehicle may initiate connectivity and start the UAV assisted positioning service within the designated area.

As mentioned above accurate vehicle positioning may be key for V2X applications such as lane changing, remote driving, platooning, etc. The GPS signals that these application rely on are sensitive to blockages or obstructions such as stacked highways, buildings in urban canyons, etc., and their accuracy may be degraded. Degraded accuracy of GPS signal data may result in collisions of vehicles relying on the GPS signal data to navigate. Thus, it may be necessary to maintain GPS line of sight connection to a GPS satellite as the vehicle moves through different environments.

In some cases, a UAV may be configured to monitor a predefined area such as a geofenced area. The predefined area may be an area in which GPS signals are blocked from being provided to vehicles as the vehicles enter. For example, the predefined area may be an overpass stacked highway, buildings in an urban canyon, an area with heavy foliage, etc.

In some cases, the predefined area may include, or otherwise be associated with, a base station that may be in communication with the UAV. For example, the UAV may receive identification data and/or authorization data (e.g., credential information) from the base station that identifies and/or authorizes vehicles as they enter the predefined area. In some cases, a vehicle may enter the predefined area and a communication system onboard the vehicle (e.g., a V2X communication system) may establish communication with the base station. Once the base station has identified and/or authorized the vehicle, the base station may send a transmission to the UAV indicating that the vehicle is acceptable to participate in a UAV GPS assisted service.

In some cases, the UAV and/or the vehicle may establish connection with the base station via an interface, such as a V2X PC5 interface and send a resource request message to the base station. For example, the UAV and/or the vehicle may transmit and establish Radio Resource Control (RRC) protocol over the air interface with the base station. In some examples, the UAV and/or the vehicle may establish connectionless protocol over the air by transmitting a broadcast (e.g., multicast) of its data packet to surrounding receivers of the base station. Broadcasts (e.g., multicast) may be used to send multiple copies of the original transmission to improve reliability. Upon receiving the resource request message (which may include geolocation, geofencing data, geometrical zone data, zone index data, traffic pattern data, UAV SIM data, GPS location data, etc.) from the UAV and/or the vehicle, the base station may schedule certain resources (e.g., frequency, bandwidth, size of the packet, the vehicle SIM data, the GPS location of the vehicle, vehicle speed, vehicle velocity, length and width of zone index, etc.) and send the resources back to the UAV and/or the vehicle. In some cases, if both the UAV and the vehicle resources are available, authenticated, and match specific geometrical zone indexes, the UAV can establish a direct communication with the vehicle. Both the UAV and the vehicle may continue to send control information to the base station periodically. In cases where direct communication of the UAV and the vehicle is disconnected, the base station may reestablish the connection. In some cases, a zone index may refer to a predefined area. In other cases, a zone index may refer to a zone within a predefined area.

For example, the UAV may establish a Wi-Fi connection with the vehicle, a PC5 connection with the vehicle, a unicast connection with the vehicle, etc. Once the UAV has established communication with the vehicle, the communication system of the vehicle may provide GPS data to the UAV and the UAV may maintain a relative position to the vehicle as the vehicle moves through the predefined area. Using the GPS data received from the communication system of the vehicle, the UAV may communicate with a GPS satellite and receive GPS signals from the GPS satellite. In some cases, the UAV may calculate or otherwise determine position data of the vehicle based on the GPS data received from the communication system of the vehicle and the GPS signals received from the GPS satellite and provide the position data to the vehicle. In other cases, the UAV may provide the GPS signals received from the GPS satellite to the communication system of the vehicle thereby allowing the vehicle to calculate its own position data.

In some cases, once the vehicle has left the predefined area, the UAV may return to an initial position to wait for additional vehicles to enter the predefined area and to provide GPS assisted service. In some cases, the predefined area can be divided into different zones identified by zone IDs (e.g., Zone 1, Zone 2, Zone 3, etc.) and the vehicle may determine the zone ID of the zone in which it is located. For example, the vehicle may perform an operation (e.g., a modulo operation) based on its own geolocation and information received from the base station (e.g., length and width of a zone, number of zones in length, number of zones in width, a reference point coordinate, etc.) in order to determine which zone the vehicle is located in. In some cases, each zone may be a different size. For example, a first zone may be smaller (e.g., 25 m$^2$) then a second zone (e.g., 100 m$^2$, 200 m$^2$, etc.) etc. In some examples, the base station may send zone information associated with vehicle to the UAV. If the UAV is within a zone included in the zone information, it may respond to the base station and start GPS assisted service. If the UAV is not in the zone included in the zone information, the base station may direct a closest UAV to come to the zone.

In some cases, the UAV may determine that the vehicle is about to leave a first predefined area (e.g., a first zone) and will be entering a second predefined area (e.g., a second zone) that may also provide GPS assisted services. For example, the second predefined area may also include an area in which GPS signals are blocked from being provided to vehicles as the vehicles enter. The second predefined area may include a second base station that is able to identify and/or authorize vehicles as they enter the predefined area. In some examples, the UAV may establish communication with the second base station and send a transmission indicating that the vehicle will be leaving the first predefined area and entering the second predefined area. In some examples, the transmission may include an indication that the vehicle is authorized to participate with GPS assisted services and that the UAV is requesting a handover from the first base station to the second base station such that the UAV may maintain the relative position to the vehicle and continue to provide the GPS assisted services as the vehicle moves to the second predefined area.

In some examples, as the vehicle moves from the first predefined area to the second predefined area, the UAV may send a transmission to the second base station including an indication that the vehicle is authorized to participate with GPS assisted services and the base station may instruct a second UAV that is located in the second predefined area to establish a connection with the vehicle and to provide GPS assisted services to the vehicle.

In this way, vehicles that rely on GPS signals while operating, such as vehicles operating V2X applications, can rely on the accuracy of the signals even when the vehicles are traveling through an environment in which GPS signals are typically blocked.

ILLUSTRATIVE ENVIRONMENT

FIG. 1 is an illustrative environment 100 for providing assisted GPS services via one or more UAVs. The environment 100 may include a UAV 102 and a base station 104 that are associated with an access network of a wireless service provider. The environment 100 is illustrated in simplified form and may include many more components.

The environment 100 may also include a vehicle 106 and a GPS satellite(s) 108. Although the environment 100 only illustrates a single vehicle 106 and a single GPS satellite 108, it is to be understood that any number of vehicle(s) 106 may be present in the environment 100 and that any number of GPS satellite(s) 108 may be present to provide GPS signals to the UAV 102 and/or the vehicle 106. In some cases, the UAV 102 and/or the vehicle 106 may require a minimum number of GPS satellites(s) 108 to communicate with in order to determine a 2D location, a 3D location, a confidence score associated with a determined location being above a threshold amount, etc. For example, the UAV 102 and/r the vehicle 106 may require communication with at last four different GPS satellite(s) 108 in order to determine that a confidence score associated with a determined location is above a threshold amount.

The base station 104 may handle traffic and signals between computing devices, such as a communication system on board the vehicle 106, the base station 104, and the UAV 102. For example, the base station 104 may perform the transcoding of speech channels, allocation of radio channels to electronic devices, paging, transmission and reception of voice and data, as well as other functions. The base station 104 may include several base transceiver stations (BTS), each BTS may include a transceiver, antenna, and additional network switch and control equipment that provide a network cell for facilitating wireless communication between computing devices and the access network associated with the base station 104. In some examples, the base station 104 includes a gNodeB and/or an eNodeB.

The communication system of the vehicle 106 may part of a computing device such as a smart phone, a personal digital assistant, a netbook, a laptop computer, and/or another electronic that is capable of sending and/or receiving voice or data using a cellular access network, and/or over a Wi-Fi network, or some other type of network. In some instances, the communication system of the vehicle 106 can be configured to send and receive data using any wired or wireless protocols.

In some configurations, the base station 104 may be configured as one or more application servers that provide support for one more applications. Some example applications include, but are not limited to browser applications, messaging applications, voice applications (e.g., Voice over Internet Protocol "VoIP" applications), video applications, and the like. While the base station 104 is illustrated within the access network, one or more other computing devices may be located outside of the access network. For example, an application server, or some other server or device, may be connected to the access network via one or more external packet switched networks, such as the Internet.

In general, a base station, such as the base station 104 can be implemented as a variety of technologies to provide wired and/or wireless access to the network, as discussed herein. In some instances, the base station 104 can include a 3GPP RAN, such a GSM/EDGE RAN (GERAN), a Universal Terrestrial RAN (UTRAN), an evolved UTRAN (E-UTRAN), or a New Radio (5G) RAN, or alternatively, a "non-3GPP" RAN, such as a Wi-Fi RAN, or another type of wireless local area network (WLAN) that is based on the IEEE 802.11 standards. Further, the base station 104 can include any number and type of transceivers and/or base stations representing any number and type of macrocells, microcells, picocells, or femtocells, for example, with any type or amount of overlapping coverage or mutually exclusive coverage.

In some instances, the environment 100 can further include one or more servers, to facilitate communications by and between the various devices in the environment 100. That is, environment 100 can include any computing devices implementing various aspects of one or more of second, third, fourth generation, and fifth generation (2G, 3G, 4G, and 5G) cellular wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5GNR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UAV 102, the base station 104, and/or the vehicle 106. While FIG. 1 illustrates an example environment 100, it is understood in the context of this document, that the techniques discussed herein may also be implemented in other networking technologies.

In some cases, the UAV 102 may be configured to monitor a predefined area such as a geofenced area. The predefined area may be an area in which GPS signals are blocked from being provided to vehicles as the vehicles enter. In the case of FIG. 1, the predefined area is an area surrounded by buildings 110 blocking GPS signals from the GPS satellite 108. For example, UAV 102 may monitor the predefined area using one of or both direct monitoring (e.g., visual from camera or other sensors) and indirect monitoring via the base station 104, which may relay zone ID information as the vehicle 106 enters the predefined area. The direct monitoring may include establishing a geofence around the predefined area then determining that the vehicle 106 has entered the geofence. The indirect monitoring may include receiving zone ID information from the vehicle 106 and/or the base station 104 after the vehicle 106 has already entered the pre-defined area.

In some cases, the predefined area may include, or otherwise be associated with, the base station 104 that may be in communication with the UAV 102. For example, the UAV 102 may receive identification data and/or authorization data from the base station 104 that identifies and/or authorizes vehicles as they enter the predefined area. In some cases, the vehicle 106 may enter the predefined area and a communication system onboard the vehicle 106 (e.g., a V2X communication system) may establish communication with the base station 104. Once the base station 104 has identified and/or authorized the vehicle 106, the base station 104 may send a transmission to the UAV 102 indicating that the vehicle 106 is acceptable to participate in a UAV GPS assisted service.

In some cases, the UAV 102 and/or the vehicle 106 may establish connection with the base station 104 via an interface, such as a V2X PC5 interface and send a resource request message to the base station 104. For example, the UAV 102 and/or the vehicle 106 may transmit and establish Radio Resource Control (RRC) protocol over the air interface with the base station 104. In some examples, the UAV 102 and/or the vehicle 106 may establish connectionless protocol over the air by transmitting a broadcast (e.g., multicast) of its data packet to surrounding receivers of the base station 104. Broadcasts (e.g., multicast) may be used to send multiple copies of the original transmission to improve reliability. Upon receiving the resource request message (which may include geolocation, geofencing data, geometrical zone data, zone index data, traffic pattern data, UAV SIM data, GPS location data, etc.) from the UAV 102 and/or the vehicle 106, the base station 104 may determine certain resources (e.g., frequency, bandwidth, size of the packet, the vehicle SIM data, the GPS location of the vehicle, vehicle speed, vehicle velocity, length and width of zone index, etc.) and send the resources back to the UAV 102 and/or the vehicle 106. In some cases, if both the UAV 102 and the vehicle 106 resources are available, authenticated, and match specific geometrical zone indexes (e.g., both the UAV 102 and the vehicle 106 are located within the same predefined area), the UAV 102 can establish a direct communication with the vehicle 106. Both the UAV 102 and the vehicle 106 may continue to send control information to the base station 104 periodically. In cases where direct communication of the UAV 102 and the vehicle 106 is disconnected, the base station 104 may reestablish the connection. In some cases, a zone index may refer to a predefined area. In other cases, a zone index may refer to a zone within a predefined area.

For example, the UAV 102 may establish a Wi-Fi connection with the vehicle 106, a PC5 connection with the vehicle 106, a unicast connection with the vehicle 106, etc. Once the UAV 102 has established communication with the vehicle 106, the communication system of the vehicle 106 may provide GPS data to the UAV 102 and the UAV 102 may maintain a relative position to the vehicle 106 as the vehicle 106 moves through the predefined area. Using the GPS data received from the communication system of the vehicle 106, the UAV 102 may communication with the GPS satellite 108 and receive GPS signals from the GPS satellite 108. In some cases, the UAV 102 may calculate position data of the vehicle 106 based on the GPS data received from the communication system of the vehicle 106 and the GPS signals received from the GPS satellite 108 and provide the position data to the vehicle 106. In other cases, the UAV 102 may provide the GPS signals received from the GPS satellite 108 to the communication system of the vehicle 106 thereby allowing the vehicle 106 to calculate its own position data. In some cases, the UAV 102 may provide GPS signals received from the GPS satellite 108 to the base station 104 and the base station 104 may provide position data to the vehicle 106.

In some examples, the vehicle 106 may provide vehicle data, such as speed, direction, heading, etc.) to the base station 104 and the base station 104 may provide the vehicle data to the UAV 102. In this way, the UAV 102 may be aware of the vehicles 106 course such that the UAV 102 may maintain a relative position with the vehicle 106.

In some cases, once the UAV 102 and/or the base station 104 has established a communication session with the vehicle 106, the UAV 102 and/or the base station 104 may measure and/or otherwise monitor a signal strength of the GPS signal being used by the vehicle 106. In some examples, the UAV 102 and/or the base station 104 may initiate providing GPS assisted services to the vehicle 106 in response to the signal strength of the GPS signal dropping below a threshold value.

In some cases, once the vehicle 106 has left the predefined area, the UAV 102 may return to an initial position to wait for additional vehicles to enter the predefined area and to provide GPS assisted service. In some cases, the predefined area can be divided into different zones identified by zone IDs (e.g., Zone 1, Zone 2, Zone 3, etc.) and the vehicle 106 may determine the zone ID of the zone in which it is located. For example, the vehicle 106 may perform an operation (e.g., a modulo operation) based on its own geolocation and information received from the base station 104 (e.g., length and width of a zone, number of zones in length, number of zones in width, a reference point coordinate, etc.) in order to determine which zone the vehicle 106 is located in. In some cases, each zone may be a different size. For example, a first zone may be smaller (e.g., 25 m$^2$) then a second zone (e.g., 100 m$^2$, 200 m$^2$, etc.) etc. In some examples, the base station 104 may send zone information associated with the vehicle 106 to the UAV 102. If the UAV 102 is within a zone included in the zone information, it may respond to the base station 104 and start GPS assisted service. If the UAV 102 is not in the zone included in the zone information, the base station 104 may direct a closest UAV to come to the zone and perform GPS assisted services for the vehicle 106.

In some cases, the UAV 102 may use the sensor data to maintain a course relative to the vehicle 106 when a communication session with the vehicle 106 has been interrupted. For example, the UAV 102 and the vehicle 106 may be in communication (e.g., via Wi-Fi, etc.) when the vehicle 106 travels into an environment that interrupts the communication (e.g., traveling through a tunnel, under a bridge, etc.). The UAV 102 may utilize sensor data obtained from one or more sensors included in the UAV 102 to maintain a position relative to the vehicle 106 even though the UAV 102 and the vehicle 106 are no longer in communication or a signal level associated with the communication has dropped below a threshold value. For example, the UAV 102 may identify the vehicle 106 via visual data included in the sensor data and maintain a position relative to the vehicle 106 via the visual data. In some cases, the UAV 102 may utilize inertial data from the sensor data to maintain a course relative to the vehicle 106 by maintaining a known velocity associated with the vehicle 106.

In some cases, the UAV 102 may use sensors to determine a relative location of the vehicle 106 with respect to the UAV 102 and use the GPS position data received from the GPS satellite 108 to determine the vehicle 106 position. For example, the UAV 102 may receive GPS position data from the GPS satellite 108 and determine an estimated position of the vehicle 106 based on a range sensor (e.g., lidar, radar, etc.) to determine a relative location of the vehicle 106 with respect to the UAV 102. The UAV 102 may determine an estimated position of the vehicle 106 based on the GPS position data and the range sensor data.

Figure 2:
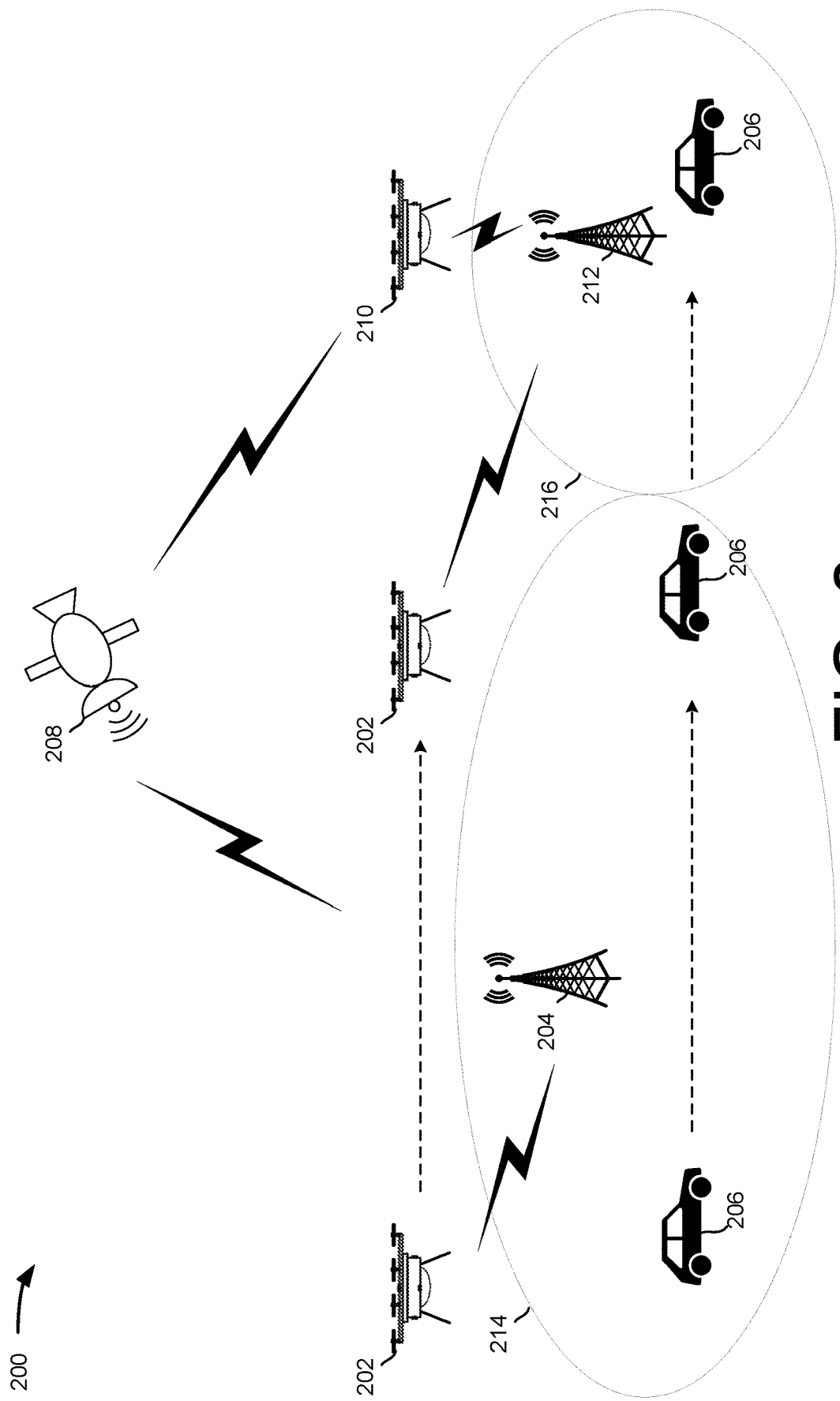
FIG. 2 illustrates another example environment in which the present disclosure may be implemented.

FIG. 2 is an illustrative environment 200 for providing assisted GPS services via one or more UAVs. The environment 200 may include a first UAV 202 (which may be the same or similar to the UAV 102), a first base station 204 (which may be the same or similar to the base station 104), a vehicle 206 (which may be the same or similar to the vehicle 106), GPS satellite 208 (which may be the same or similar to the GPS satellite 108), a second UAV 210 (which may be the same or similar to the UAV 102), and a second base station 212 (which may be the same or similar to the base station 104). The environment 200 is illustrated in simplified form and may include many more components.

In some cases, the first UAV 202 may determine that the vehicle 206 is about to leave a first predefined area 214 (e.g., a first zone) and will be entering a second predefined area 216 (e.g., a second zone) that may also provide GPS assisted services. For example, the first predefined area 214 and the second predefined area 216 may include an area in which GPS signals are blocked from being provided to vehicles as the vehicles, such as the vehicle 206, enter. The second predefined area 216 may include the second base station 212 that is able to identify and/or authorize vehicles as they enter the predefined area 216. In some examples, the first UAV 202 may establish communication with the second base station 212 and send a transmission indicating that the vehicle 206 will be leaving the first predefined area 214 and entering the second predefined area 216. In some examples, as the vehicle 206 moves from the first predefined area 214 to the second predefined area 216, the second base station 212 may instruct the second UAV 210 that is located in the second predefined area 216 to establish a connection with the vehicle 206 and to provide GPS assisted services to the vehicle 206. For example, once the second UAV 210 has established communication with the vehicle 206, the communication system of the vehicle 206 may provide GPS data to the second UAV 210 and the second UAV 210 may maintain a relative position to the vehicle 206 as the vehicle moves through the second predefined area 216. Using the GPS data received from the communication system of the vehicle 206, the second UAV 210 may communication with the GPS satellite 208 and receive GPS signals from the GPS satellite 208. In some cases, the second UAV 210 may calculate position data of the vehicle 206 based on the GPS data received from the communication system of the vehicle 206 and the GPS signals received from the GPS satellite 208 and provide the position data to the vehicle 206. In other cases, the second UAV 210 may provide the GPS signals received from the GPS satellite 208 to the communication system of the vehicle 206 thereby allowing the vehicle 206 to calculate its own position data.

Figure 3:
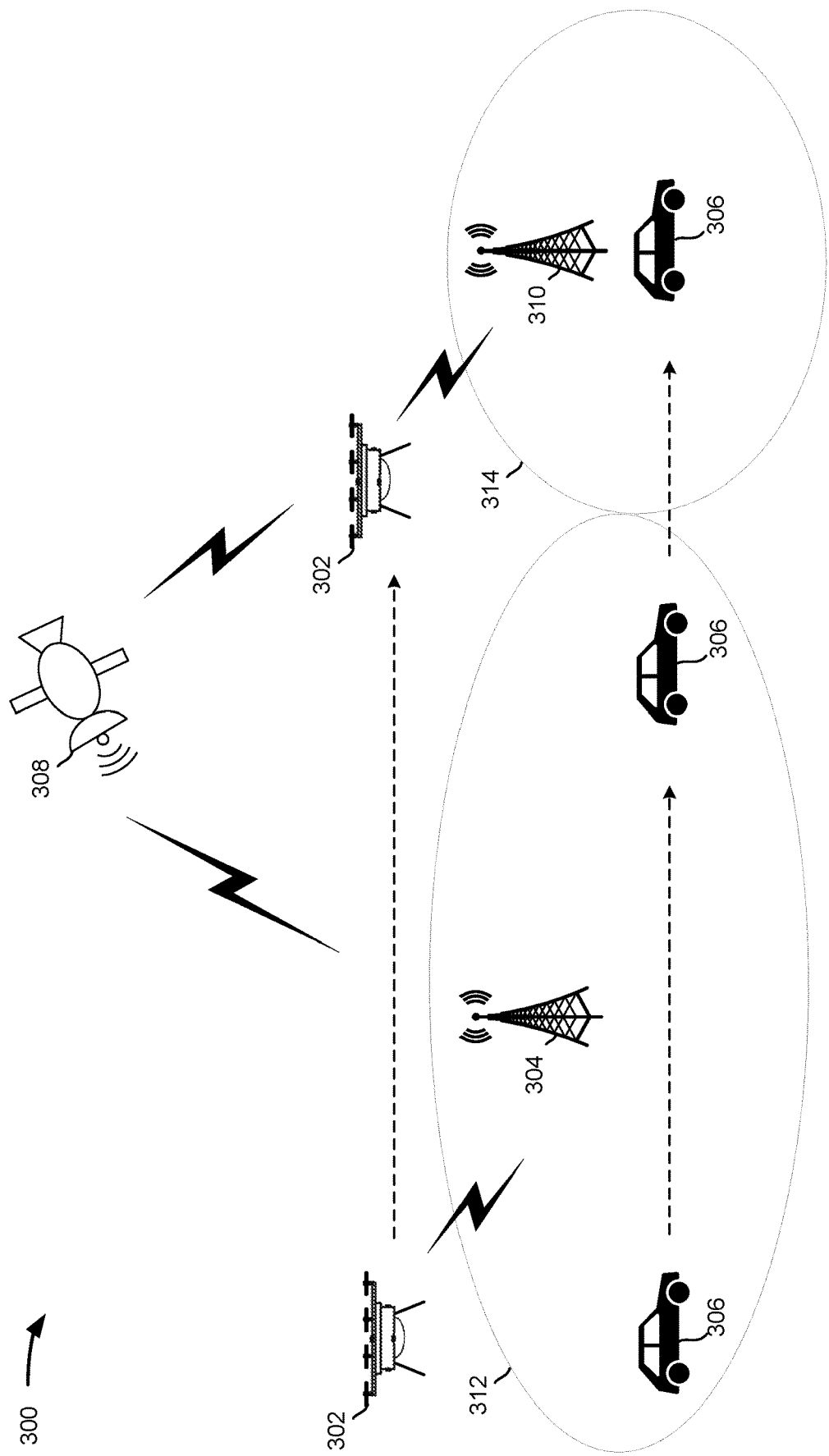
FIG. 3 illustrates another example environment in which the present disclosure may be implemented.

FIG. 3 is an illustrative environment 300 for providing assisted GPS services via one or more UAVs. The environment 300 may include a UAV 302 (which may be the same or similar to the UAV 102), a first base station 304 (which may be the same or similar to the base station 104), a vehicle 306 (which may be the same or similar to the vehicle 106), GPS satellite 308 (which may be the same or similar to the GPS satellite 108), and a second base station 310 (which may be the same or similar to the base station 104). The environment 300 is illustrated in simplified form and may include many more components.

In some cases, the UAV 302 may determine that the vehicle 306 is about to leave a first predefined area 312 and will be entering a second predefined area 314 that may also provide GPS assisted services. For example, the first predefined area 312 and the second predefined area 314 may include an area in which GPS signals are blocked from being provided to vehicles as the vehicles, such as the vehicle 306, enter. The second predefined area 314 may include the second base station 310 that is able to identify and/or authorize vehicles as they enter the predefined area 314. In some examples, the UAV 302 may establish communication with the second base station 310 and send a transmission indicating that the vehicle 306 will be leaving the first predefined area 312 and entering the second predefined area 314. In some examples, the transmission may include an indication that the vehicle 306 is authorized to participate with GPS assisted services and that the UAV 302 is requesting a handover from the first base station 304 to the second base station 310 such that the UAV 302 may maintain the relative position to the vehicle 306 and continue to provide the GPS assisted services as the vehicle 306 moves to the second predefined area 314. For example, once the UAV 302 has performed a handoff to the second base station 310 and is still in communication with the vehicle 306, the communication system of the vehicle 306 may provide GPS data to the UAV 302 and the UAV 302 may maintain a relative position to the vehicle 306 as the vehicle moves through the second predefined area 314. Using the GPS data received from the communication system of the vehicle 306, the UAV 302 may communication with the GPS satellite 308 and receive GPS signals from the GPS satellite 308. In some cases, the UAV 302 may calculate position data of the vehicle 306 based on the GPS data received from the communication system of the vehicle 306 and the GPS signals received from the GPS satellite 308 and provide the position data to the vehicle 306. In other cases, the UAV 302 may provide the GPS signals received from the GPS satellite 308 to the communication system of the vehicle 306 thereby allowing the vehicle 306 to calculate its own position data.

Figure 4:
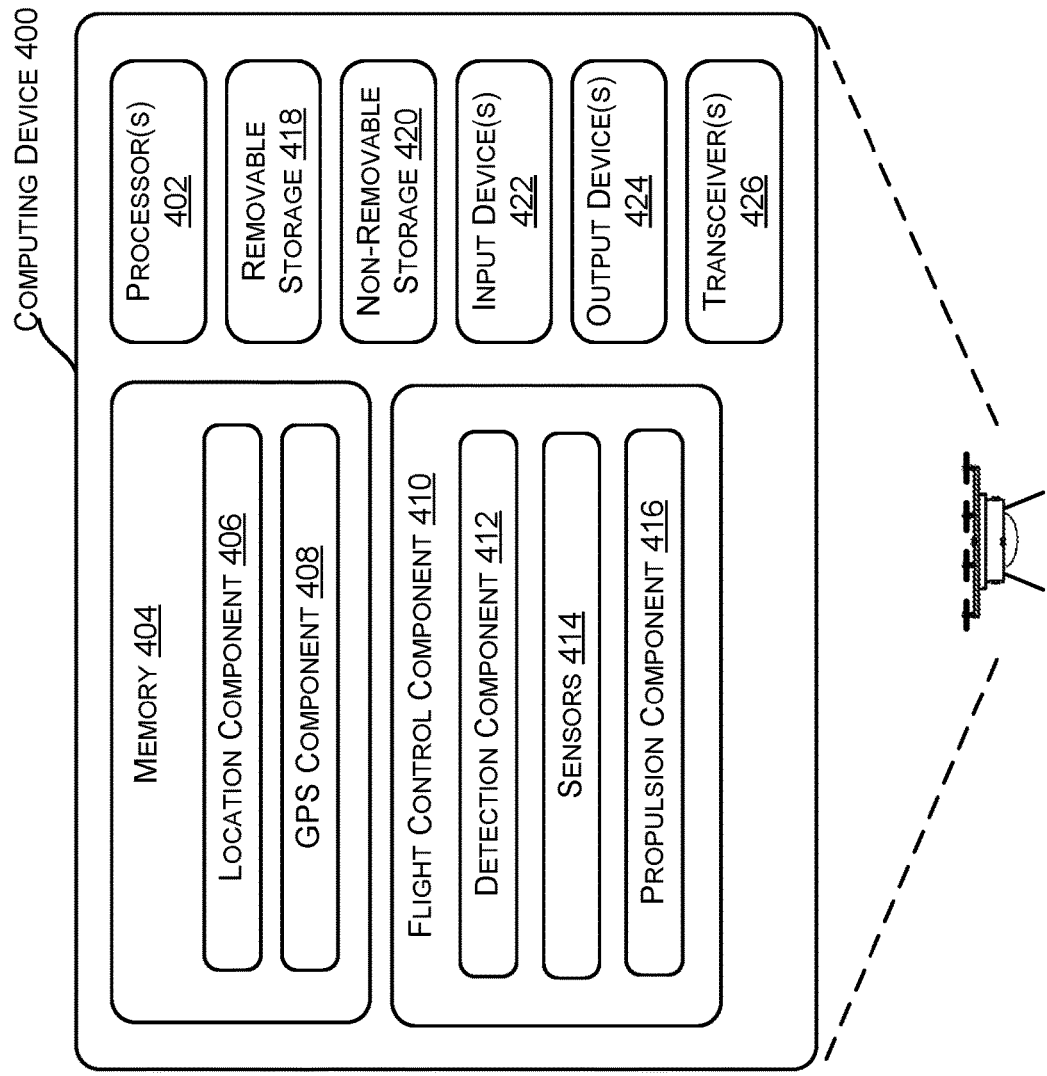
FIG. 4 illustrates an example block diagram of a computing device.

FIG. 4 is a block diagram of a computing device 400 including components for providing GPS assisted services to one or more vehicles. In some examples, the computing device 400 (also referred to as a device 400) can be configured to implement some or all of the techniques discussed herein and may include a UAV, such as the UAV 102, the UAV 202, and/or the UAV 302.

FIG. 4 shows basic, high-level components of the device 400. Generally, the device 400 may comprise and/or may be implemented in any of various network components discussed herein, including those components illustrated in FIGS. 1-3.

In various examples, the device 400 may include processor(s) 402 and memory 404. Depending on the exact configuration and type of computing device, the memory 404 may be volatile (such as RAM), non-volatile (such as ROM, flash memory, etc.) or some combination of the two. The memory 404 may include a location component 406 and/or a GPS component 408. The device 400 may also include a flight control component 410 having a detection component 412, sensors 414, and a propulsion component 416.

In some examples, the location component 406 may be used to determine location data (e.g., a location) associated with the device 400 and provide the location data to a computing device, such as the base station 104 and/or the vehicle 106. In some examples, the location component 406 may be used to generate and/or identify geofences of predefined areas, such as the first predefined area 214 and/or the second predefined area 216.

In some examples, the GPS component 408 may be used to send and/or receive GPS data associated with a vehicle and/or a GPS satellite. For Example, the device 400 may establish communication with a vehicle and a communication system of the vehicle may provide GPS data to the GPS component 408 and the device 400 may maintain a relative position to the vehicle as the vehicle moves through a predefined area. Using the GPS data received from the communication system of the vehicle, the GPS component 408 may communication with a GPS satellite and receive GPS signals from the GPS satellite. In some cases, the GPS component 408 may calculate position data of the vehicle based on the GPS data received from the communication system of the vehicle and the GPS signals received from the GPS satellite and provide the position data to the vehicle. In other cases, the GPS component 408 may provide the GPS signals received from the GPS satellite to the communication system of the vehicle thereby allowing the vehicle to calculate its own position data.

The flight control component 410 may be configured to maintain the device 400 in an airborne state proximate to a vehicle, such as the vehicle 106. The flight control component 410 may further comprise a detection component 412 which may include sensors 414, such as one or more cameras, radar sensors, lidar sensors, sonar sensors, inertial sensors, accelerometer sensors, and the like, to provide sensor data (e.g., visual data) of surroundings of the device 400 and to detect the surroundings of the device 400 based at least in part on the sensor data. In some cases, the device 400 may use the sensor data to maintain a course relative to a vehicle when a communication session with the vehicle has been interrupted. For example, the device 400 and a vehicle, such as the vehicle 106, may be in communication (e.g., via Wi-Fi,) when the vehicle travels into an environment that interrupts the communication (e.g., traveling through a tunnel, under a bridge, etc.). The device 400 may utilize the sensor data to maintain a position relative to the vehicle even though the device 400 and the vehicle are no longer in communication or a signal level associated with the communication has dropped below a threshold value. For example, the device 400 may identify the vehicle via visual data included in the sensor data and maintain a position relative to the vehicle via the visual data. In some cases, the device 400 may utilize inertial data from the sensor data to maintain a course relative to the vehicle by maintaining a known velocity associated with the vehicle.

The flight control component 410 may further comprise a propulsion component 416 comprising one or more power sources, motors, propellers, control and navigation systems, etc., may be configured to propel the device 400 including launching the device 400 from a landing platform upon detection of a vehicle entering a predefined area, adjusting a flight path based at least in part on the surroundings, and maintaining the device 400 within a predetermined proximity of the vehicle based on the surroundings, for example within 50 feet of the vehicle.

In some examples, the processor(s) 402 is a central processing unit (CPU), a graphics processing unit (GPU), both CPU and GPU, or other processing unit or component known in the art. Furthermore, the processor(s) 402 may include any number of processors and/or processing cores. The processor(s) 402 is configured to retrieve and execute instructions from the memory 404.

The memory 404 can also be described as non-transitory computer-readable media or machine-readable storage memory, and may include removable and non-removable media implemented in any method or technology for storage of information, such as computer executable instructions, data structures, program modules, or other data.

The memory 404 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 400 also includes additional data storage devices (removable and/or non-removable) such as, for example, magnetic disks, optical disks, or tape. Such additional storage is illustrated in FIG. 4 by removable storage 418 and non-removable storage 420. Tangible computer-readable media can include volatile and non-volatile, removable and non-removable media implemented in any method or technology for storage of information, such as computer readable instructions, data structures, program modules, or other data. The memory 404, the removable storage 418 and the non-removable storage 420 are all examples of computer-readable storage media. Computer-readable storage media include, but are not limited to, RAM, ROM, EEPROM, flash memory or other memory technology, CD- ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 400. Any such tangible computer-readable media can be part of the device 400.

The memory 404, the removable storage 418, and/or the non-removable storage 420 may in some cases include storage media used to transfer or distribute instructions, applications, and/or data. In some cases, the memory 404, the removable storage 418, and/or the non-removable storage 420 may include data storage that is accessed remotely, such as network-attached storage that the device 400 accesses over some type of data communications network.

In various examples, any or all of the memory 404, the removable storage 418, and/or the non-removable storage 420 may store programming instructions that, when executed, implement some or all of the function functionality described herein.

The device 400 also can include input device(s) 422, such as a keypad, a cursor control, a touch-sensitive display, voice input device, etc., and output device(s) 424 such as a display, speakers, printers, etc. These devices are well known in the art and need not be discussed at length here.

As illustrated in FIG. 4 the device 400 also includes one or more wired or wireless transceiver(s) 426. For example, the transceiver(s) 426 can include a network interface card (NIC), a network adapter, a LAN adapter, or a physical, virtual, or logical address to connect to various networks, devices, or components illustrated in figures herein. To increase throughput when exchanging wireless data, the transceiver(s) 426 can utilize multiple-input/multiple-output (MIMO) technology. The transceiver(s) 426 can comprise any sort of wireless transceivers capable of engaging in wireless, radio frequency (RF) communication. The transceiver(s) 426 can also include other wireless modems, such as a modem for engaging in Wi-Fi, WiMAX, Bluetooth, infrared communication, and the like.

Figure 5:
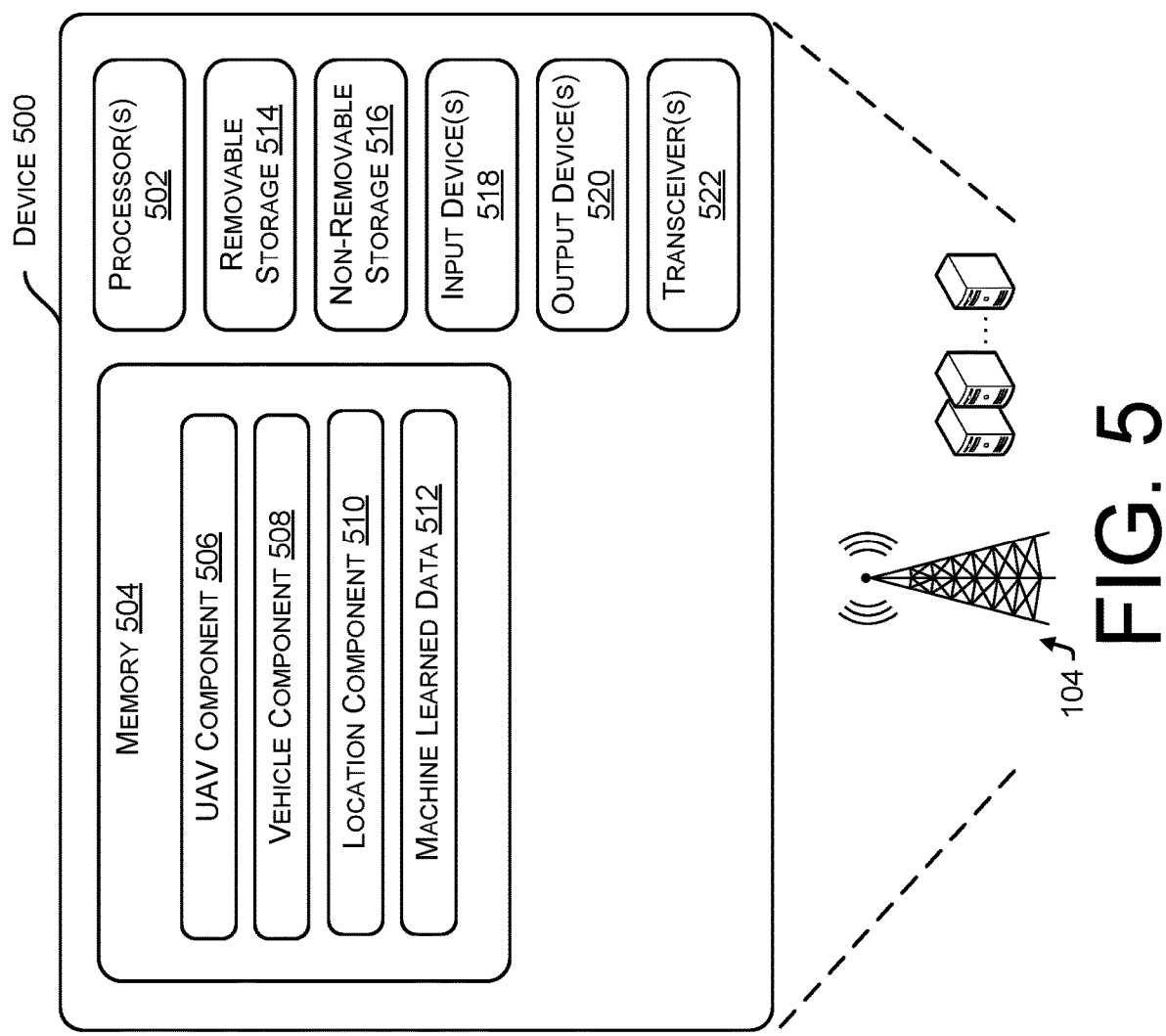
FIG. 5 illustrates an example block diagram of another computing device.

FIG. 5 is a block diagram of a device 500 configured to implement the techniques discussed herein. FIG. 5 shows only basic, high-level components of the device 500. Generally, the device 500 may comprise and/or may be implemented in any of various network components discussed herein, including those components illustrated in FIG. 1. For example, the device 500 may be implemented in the base station 104, which may include an eNB, a gNB, a core network device, or other network device.

In various examples, the device 500 may include processor(s) 502 and memory 504. Depending on the exact configuration and type of computing device, the memory 504 may be volatile (such as RAM), non-volatile (such as ROM, flash memory, etc.) or some combination of the two. The memory 504 may include a UAV component 506, a vehicle component 508, location component 510, and/or machine learned data 512.

In some examples, the UAV component 506 may be configured to communicate with one or more UAVs, such as the UAV 102, and to store data associated with the one or more UAVs. For example, the device 500 may be associated with one or more UAVs within a predefined area. The UAV component 506 may be configured to communicate with each UAV and provide instructions, such as an instruction to provide GPS assisted services to a particular vehicle that has entered, or is about to enter, the predefined area. In some cases, the UAV component 506 may store information associated with UAVs outside the predefined area. For example, the UAV component 506 may be configured to store data associated with UAVs located in neighboring predefined areas and instruct a UAV located in its own predefined area to communicate with a UAV located in a neighboring predefined area in order to perform a handover of a vehicle from one UAV to another.

In some examples, the vehicle component 508 may be configured to communicate with a communication system onboard a vehicle (e.g., a V2X communication system) and to store data associated with the vehicle and/or the communication system. In some cases, the data can include data received from the communication system representing one or more conditions (e.g., GPS signal quality level) at the communication system. In some examples, the data can represent identification information associated with the vehicle, the communication system, a user associated with the vehicle, an account associated with a user, an account associated with the vehicle, etc. In some cases, the vehicle component 508 may utilize the data (e.g., identification information) to authorize the vehicle to participate in the GPS assisted service.

In some examples, the location component 510 can include a location of the vehicles, the location of the UAV, the location of the base station, and/or the location of other base stations. For example, the location component 510 can be based on GPS data, base station triangulation data, and the like. In some examples, the location component 510 can include velocity data and heading data, which may be indicative of the vehicle being at one location for a period of time or on the move between predefined areas. In some cases, the location component 510 may be used to generate and/or identify geofences of predefined areas, such as the first predefined area 214 and/or the second predefined are 216.

In some examples, the machine learned data 512 can include one or more machine learned models or heuristics that can be used to identify vehicles and/or UAVs to participate in GPS assisted services. For example, the machine learned data 512 can include weight(s) for various factors that can be used to set threshold(s) or likelihoods and/or determine factors that increase or decrease threshold(s) or likelihoods, and by how much.

In some examples, a machine learned model can determine which vehicles and/or UAVs to participate in GPS assisted services based on a confidence level associated with a predicted outcome being above a threshold level (e.g., such that there is a likelihood above a threshold level that utilizing a UAV to perform GPS assisted services with a vehicle will improve a communication, reduce power consumption, etc.).

In some instances, the machine learned data 512 can determine a similarity score between vehicle state data (e.g., power condition(s), 4G/5G capability, carrier aggregation capability, location data, timing advance data, etc.), radio frequency conditions (e.g., transmission power headroom data associated with the vehicle, uplink signal-to-interference-plus-noise ratio (SINR) data as determined by the base station 104, uplink path loss data determined by the base station 104, etc.), network conditions (e.g., load levels, congestions, radio access technologies (e.g., 4G/5G), downlink data information (e.g., voice traffic, video traffic, data traffic, etc.) and the like and ground truth conditions representing various conditions and outcomes. Based on a similarity score of input data associated with positive outcomes or negative outcomes, the machine learned model can instruct the vehicle and/or UAV to participate in GPS assisted services.

In some examples, the machine learned data 512 can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

In some examples, the processor(s) 502 is a central processing unit (CPU), a graphics processing unit (GPU), both CPU and GPU, or other processing unit or component known in the art. Furthermore, the processor(s) 502 may include any number of processors and/or processing cores. The processor(s) 502 is configured to retrieve and execute instructions from the memory 504.

The memory 504 can also be described as non-transitory computer-readable media or machine-readable storage memory, and may include removable and non-removable media implemented in any method or technology for storage of information, such as computer executable instructions, data structures, program modules, or other data.

The memory 504 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 500 also includes additional data storage devices (removable and/or non-removable) such as, for example, magnetic disks, optical disks, or tape. Such additional storage is illustrated in FIG. 5 by removable storage 514 and non-removable storage 516. Tangible computer-readable media can include volatile and non-volatile, removable and non-removable media implemented in any method or technology for storage of information, such as computer readable instructions, data structures, program modules, or other data. The memory 504, the removable storage 514 and the non-removable storage 516 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 500. Any such tangible computer-readable media can be part of the device 500.

The memory 504, the removable storage 514, and/or the non-removable storage 516 may in some cases include storage media used to transfer or distribute instructions, applications, and/or data. In some cases, the memory 504, the removable storage 514, and/or the non-removable storage 516 may include data storage that is accessed remotely, such as network-attached storage that the device 500 accesses over some type of data communications network.

In various examples, any or all of the memory 504, the removable storage 514, and/or the non-removable storage 516 may store programming instructions that, when executed, implement some or all of the function functionality described herein.

The device 500 also can include input device(s) 518, such as a keypad, a cursor control, a touch-sensitive display, voice input device, etc., and output device(s) 520 such as a display, speakers, printers, etc. These devices are well known in the art and need not be discussed at length here.

As illustrated in FIG. 5, the device 500 also includes one or more wired or wireless transceiver(s) 522. For example, the transceiver(s) 522 can include a network interface card (NIC), a network adapter, a LAN adapter, or a physical, virtual, or logical address to connect to various networks, devices, or components illustrated in figures herein. To increase throughput when exchanging wireless data, the transceiver(s) 522 can utilize multiple-input/multiple-output (MIMO) technology. The transceiver(s) 522 can comprise any sort of wireless transceivers capable of engaging in wireless, radio frequency (RF) communication. The transceiver(s) 522 can also include other wireless modems, such as a modem for engaging in Wi-Fi, WiMAX, Bluetooth, infrared communication, and the like.

Figure 6:
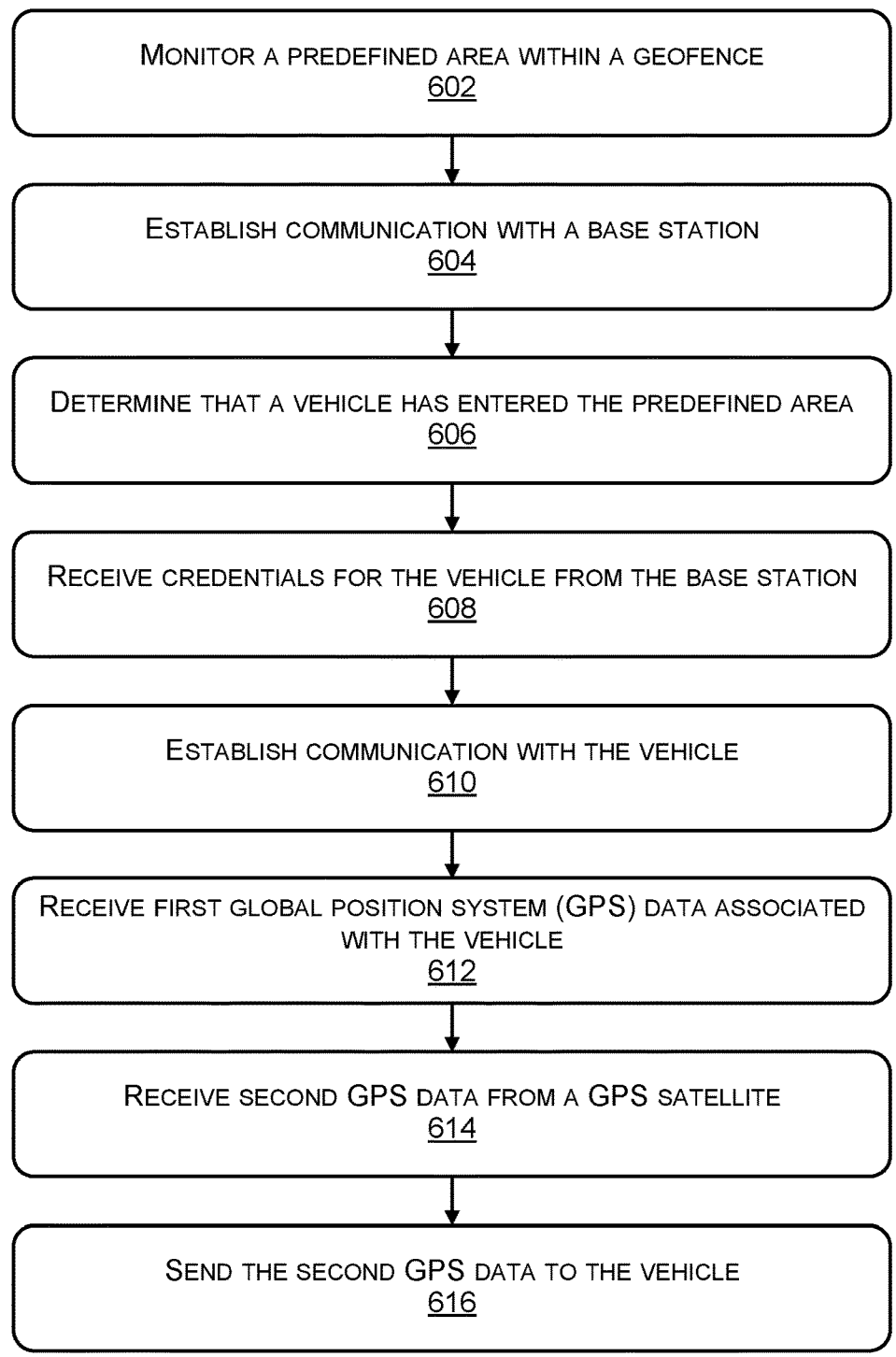
FIG. 6 illustrates a flowchart of an example process in accordance with the present disclosure.
Figure 7:
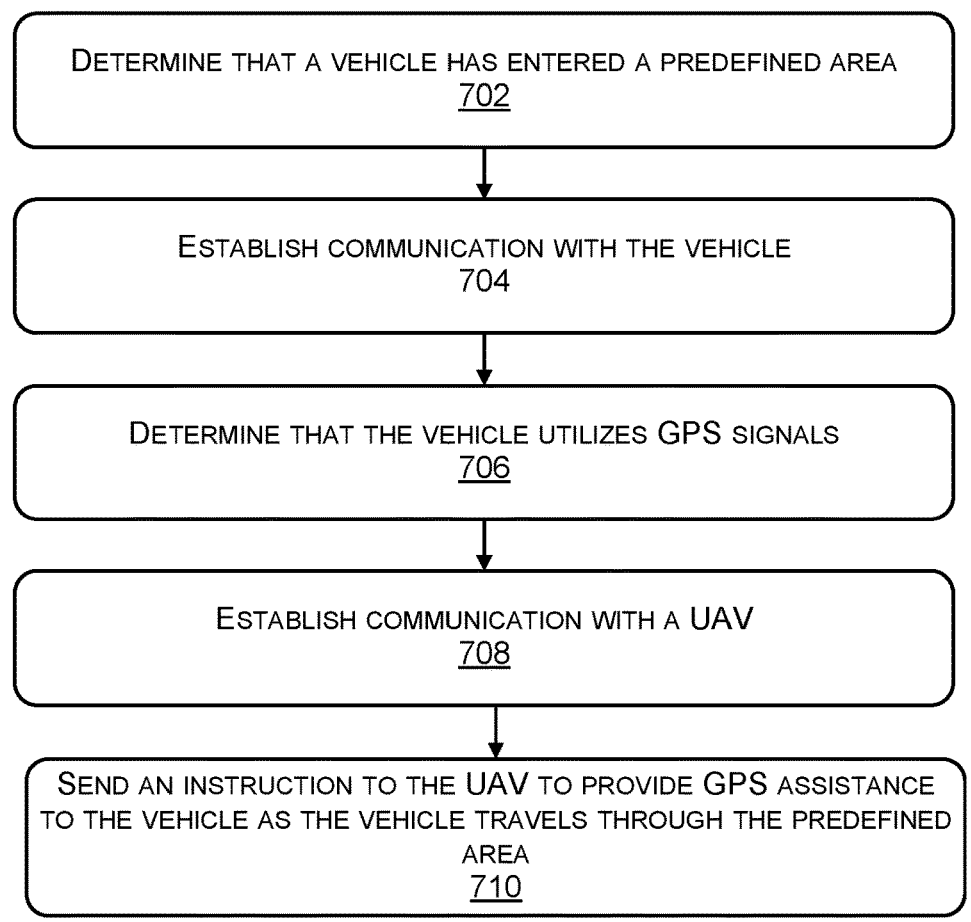
FIG. 7 illustrates another flowchart of an example process in accordance with the present disclosure.

FIGS. 6 and 7 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 6 illustrates example process for providing GPS assisted services to a vehicle. The example process 600 can be performed by the UAV 102, the UAV 202, the UAV 302, or another component or device as discussed herein.

At operation 602, the process can include monitoring a predefined area within a geofence. For example, the UAV 102 may be configured to monitor a predefined area such as a geofenced area. The predefined area may be an area in which GPS signals are blocked from being provided to vehicles as the vehicles enter. In the case of FIG. 1, the predefined area is an area surrounded by buildings 110 blocking GPS signals from the GPS satellite 108.

At operation 604, the process can include establishing communication with a base station and at operation. For example, the UAV may establish connection with the base station via an interface, such as a V2X PC5 interface and send a resource request message to the base station. For example, the UAV may transmit and establish Radio Resource Control (RRC) protocol over the air interface with the base station. In some examples, the UAV may establish connectionless protocol over the air by transmitting a broadcast (e.g., multicast) of its data packet to surrounding receivers of the base station. Broadcasts (e.g., multicast) may be used to send multiple copies of the original transmission to improve reliability.

At operation 606, the process can include determining that a vehicle has entered the predefined area. For example, the base station may send zone information associated with vehicle to the UAV. If the UAV is within a zone included in the zone information, it may respond to the base station and start GPS assisted service. In some cases, the UAV may receive identification data and/or authorization data (e.g., credential information) from the base station that identifies and/or authorizes vehicles as they enter the predefined area.

In some cases, a vehicle may enter the predefined area and a communication system onboard the vehicle (e.g., a V2X communication system) may establish communication with the base station. In some cases, the UAV may determine that the vehicle has entered the predefined area via one or more sensors (e.g., camera, radar, lidar, etc.) located on the UAV.

At operation 608 the process can include receiving credentials for the vehicle from the base station. For example, the UAV 102 may receive identification data and/or authorization data from the base station 104 that identifies and/or authorizes vehicles as they enter the predefined area. In some cases, the base station may schedule certain resources (e.g., frequency, bandwidth, size of the packet, the vehicle SIM data, the GPS location of the vehicle, vehicle speed, vehicle velocity, length and width of zone index, etc.) and send the resources back to the UAV. In some cases, if both the UAV and the vehicle resources are available, authenticated, and match specific geometrical zone indexes, the UAV can establish a direct communication with the vehicle.

At operation 610, the process can include establishing communication with the vehicle. For example, the UAV may establish a Wi-Fi connection with the vehicle, a PC5 connection with the vehicle, a unicast connection with the vehicle, etc. Once the UAV has established communication with the vehicle, the communication system of the vehicle may provide GPS data to the UAV and the UAV may maintain a relative position to the vehicle as the vehicle moves through the predefined area.

At operation 612, the process can include receiving first global position system (GPS) data associated with the vehicle. For example, once the UAV 102 has received the identifying information and/or the authorization information from the base station 104, the UAV 102 may establish communication with the vehicle 106. For example, the UAV 102 may establish a Wi-Fi connection with the vehicle 106, a PC5 connection with the vehicle 106, a unicast connection with the vehicle 106, etc. Once the UAV 102 has established communication with the vehicle 106, the communication system of the vehicle 106 may provide GPS data to the UAV 102 and the UAV 102 may maintain a relative position to the vehicle 106 as the vehicle 106 moves through the predefined area.

At operation 614, the process can include receiving second GPS data from a GPS satellite. For example, using the GPS data received from the communication system of the vehicle 106, the UAV 102 may communication with the GPS satellite 108 and receive GPS signals from the GPS satellite 108.

At operation 616, the process can include sending the second GPS data to the vehicle. For example, the UAV 102 may calculate position data of the vehicle 106 based on the GPS data received from the communication system of the vehicle 106 and the GPS signals received from the GPS satellite 108 and provide the position data to the vehicle 106. In other cases, the UAV 102 may provide the GPS signals received from the GPS satellite 108 to the communication system of the vehicle 106 thereby allowing the vehicle 106 to calculate its own position data.

FIG. 7 illustrates example process for providing GPS assisted services to a vehicle. The example process 700 can be performed by the base station 104, the base station 204, the base station 212, the bases station 304, the base station 310, or another component or device as discussed herein.

At operation 702, the process can include determining that a vehicle has entered a predefined area. For example, a predefined area may include, or otherwise be associated with, the base station 104 that may be in communication with the UAV 102.

At operation 704, the process can include establishing communication with the vehicle. For example, the vehicle 106 may enter the predefined area and a communication system onboard the vehicle 106 (e.g., a V2X communication system) may establish communication with the base station 104.

At operation 706, the process can include determining that the vehicle utilizes GPS signals. For example, the base station 104 may be associated with a service provider that provides a service to the vehicle 106 and the base station 104 may verify that the vehicle 106 receives services, such as services requiring GPS signals (e.g., V2X services), from the service provider.

At operation 708, the process can include establishing communication with a UAV and at 710, the process can include sending an instruction to the UAV to provide GPS assistance to the vehicle as the vehicle travels through the predefined area. For example, once the base station 104 has identified and/or authorized the vehicle 106, the base station 104 may send a transmission to the UAV 102 indicating that the vehicle 106 is acceptable to participate in a UAV GPS assisted service.

At operation 710, the process can include sending an instruction to the UAV to provide GPS assistance to the vehicle as the vehicle travels through the predefined area. For example, upon receiving a resource request message (which may include geolocation, geofencing data, geometrical zone data, zone index data, traffic pattern data, UAV SIM data, GPS location data, etc.) from the UAV and/or the vehicle, the base station may schedule certain resources (e.g., frequency, bandwidth, size of the packet, the vehicle SIM data, the GPS location of the vehicle, vehicle speed, vehicle velocity, length and width of zone index, etc.) and send the resources back to the UAV and/or the vehicle. In some cases, if both the UAV and the vehicle resources are available, authenticated, and match specific geometrical zone indexes, the UAV can establish a direct communication with the vehicle.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by an unmanned aerial vehicle (UAV), the method comprising:
monitoring a predefined area within a geofence;
establishing communication with a base station;
determining that a vehicle has entered the predefined area;
receiving credentials for the vehicle from the base station, the credentials including identification data and authorization data;
establishing communication with the vehicle;
receiving first global position system (GPS) data associated with the vehicle;
receiving second GPS data from a GPS satellite; and
sending the second GPS data to the vehicle;
determining that the vehicle has left the predefined area; and returning to an initial position in response to determining that the vehicle has left the predefined area.

2. The method of claim 1, wherein establishing communication with the vehicle comprises establishing a Wi-Fi connection with the vehicle.

3. The method of claim 1, further comprising maintaining a position relative to the vehicle as the vehicle moves through the predefined area.

4. The method of claim 1, further comprising:
determining that the vehicle has left the predefined area; and
ending the communication with the vehicle in response to determining that the vehicle has left the predefined area.

5. The method of claim 4, further comprising returning to an initial position in response to ending the communication with the vehicle.

6. The method of claim 1, wherein the vehicle comprises a first vehicle and the method further comprises:
determining that a second vehicle has entered the predefined area; and
receiving third GPS data from the second vehicle.

7. The method of claim 1, wherein the UAV comprises a first UAV and the method further comprises sending a transmission to a second UAV instructing the second UAV to communicate with the vehicle after the vehicle has left the predefined area.

8. The method of claim 1, further comprising:
measuring a signal strength of a GPS signal associated with the vehicle; and
determining that the signal strength is below a threshold value.

9. An unmanned aerial vehicle (UAV) comprising:
one or more processors; and
memory storing instructions operable to cause the one or more processors to perform operations comprising:
monitoring a predefined area within a geofence;
establishing communication with a base station;
determining that a vehicle has entered the predefined area;
receiving credentials for the vehicle from the base station, the credentials including identification data and authorization data;
establishing communication with the vehicle;
receiving first global position system (GPS) data associated with the vehicle;
receiving second GPS data from a GPS satellite;
sending the second GPS data to the vehicle;
determining that the vehicle has left the predefined area; and
returning to an initial position in response to determining that the vehicle has left the predefined area.

10. The UAV of claim 9, wherein establishing communication with the vehicle comprises establishing at least one of a Wi-Fi connection with the vehicle, a PC5 connection with the vehicle, or a unicast connection with the vehicle.

11. The UAV of claim 9, further comprising maintaining a position relative to the vehicle as the vehicle moves through the predefined area.

12. The UAV of claim 9, further comprising:
determining that the vehicle has left the predefined area; and
ending the communication with the vehicle in response to determining that the vehicle has left the predefined area.

13. The UAV of claim 12, further comprising returning to the initial position in response to ending the communication with the vehicle.

14. The UAV of claim 9, wherein the vehicle comprises a first vehicle and the operations further comprises:
determining that a second vehicle has entered the predefined area; and
receiving third GPS data from the second vehicle.

15. The UAV of claim 9, wherein the UAV comprises a first UAV and the operations further comprises sending a transmission to a second UAV instructing the second UAV to communicate with the vehicle after the vehicle has left the predefined area.

16. The UAV of claim 9, further comprising:
measuring a signal strength of a GPS signal associated with the vehicle; and
determining that the signal strength falls below a threshold value.

17. A method performed by a computing device comprising:
determining that a vehicle has entered a predefined area;
establishing communication with the vehicle;
determining that the vehicle utilizes GPS signals;
establishing communication with a UAV; and
sending an instruction to the UAV to provide GPS assistance to the vehicle as the vehicle travels through the predefined area and to return to an initial position in response to determining that the vehicle has left the predefined area, the instruction including identification data and authorization data.

18. The method of claim 17, wherein the computing device comprises a base station.

19. The method of claim 17, wherein the instruction includes data including at least one of frequency data, bandwidth data, size of the packet data, vehicle SIM data, a GPS location of the vehicle, vehicle speed, vehicle velocity, dimensions of a zone index.

20. The method of claim 17, further comprising:
receiving GPS data from the UAV; and
sending the GPS data to the vehicle.

* * * * *